United States Patent [19]
Nakamitsu et al.

[11] Patent Number: 5,672,445
[45] Date of Patent: Sep. 30, 1997

[54] ORGANIC ELECROLYTE SECONDARY CELL

[75] Inventors: Kazuhiro Nakamitsu; Hisashi Tukamoto; Shigeo Komatsu; Toshimichi Nakamura, all of Kyoto, Japan

[73] Assignee: Japan Storage Battery Co., Ltd., Kyoto, Japan

[21] Appl. No.: 569,293

[22] Filed: Dec. 8, 1995

[30] Foreign Application Priority Data

Dec. 9, 1994 [JP] Japan ................................ 6-331531
Feb. 13, 1995 [JP] Japan ................................ 7-049075

[51] Int. Cl.$^6$ ................................................ H01M 4/58
[52] U.S. Cl. ........................................ 429/218; 429/194
[58] Field of Search ........................... 429/60, 194, 218, 429/223, 224

[56] References Cited

U.S. PATENT DOCUMENTS

| | | | |
|---|---|---|---|
| 4,214,043 | 7/1980 | van Deutekom | 429/27 |
| 4,423,125 | 12/1983 | Basu | 429/194 |
| 5,296,319 | 3/1994 | Bito et al. | 429/194 |
| 5,427,875 | 6/1995 | Yamamoto et al. | 429/223 |

FOREIGN PATENT DOCUMENTS

| | | | |
|---|---|---|---|
| A20462575 | 12/1991 | European Pat. Off. | H01M 4/48 |
| 0462575 | 12/1991 | European Pat. Off. | H01M 4/48 |
| A20468942 | 1/1992 | European Pat. Off. | H01M 4/48 |
| A10501187 | 9/1992 | European Pat. Off. | H01M 10/40 |
| A-0541889 | 5/1993 | European Pat. Off. | H01M 4/58 |
| A10582448 | 2/1994 | European Pat. Off. | H01M 4/52 |
| A10643430 | 3/1995 | European Pat. Off. | H01M 4/52 |
| A10653797 | 5/1995 | European Pat. Off. | H01M 10/36 |
| A14111459 | 10/1991 | Germany | C01G 51/04 |
| 1304664 | 12/1989 | Japan | H01H 4/58 |
| 4162357 | 6/1992 | Japan | H01M 4/62 |

OTHER PUBLICATIONS

Patent Abstracts of Japan, vol. 017, No. 525 (E–1436), 21 Sep. 1993 & JP-A-05-144471 (Matsushita Electric Ind. Co., Ltd.), 11 Jun. 1993.

Patent Abstracts of Japan, vol. 017, No. 525 (E–1436), 21 Sep. 1993 & JP-A-05-144472 (Matsushita Electric Ind. Co., Ltd.), 11 Jun. 1993.

Electrochimica Acta, vol. 38, No. 9, Jun. 1993, Oxford GB, pp. 1159–1167, XP 000380760 Tsutomu Ohzuku et al., "Comparative Study of $LiCoO_2$, $LiNi_{1/2}Co_{1/2}O_2$ for 4 Volt Secondary Lithium Cells".

Journal of the Electrochemical Society, vol. 140, No. 7, Jul. 1993, Manchester, New Hampshire, U.S. pp. 1862–1870, XP 000403878, Tsutomu Ohzuku et al., "Electrochemistry and Structural Chemistry of $LiNiO_2$ (R3m) for 4 Volt Secondary Lithium Cells".

Journal of the Electrochemical Society, vol. 141, No. 8, Aug. 1994, Manchester, New Hampshire, U.S. pp. 2010–2014, XP 000471054, Atsushi et al. "Solid–State Redox Reactions of $LiNi_{1/2}Co_{1/2}O_2$ (R3m) for 4 Volt Secondary Lithium Cells".

Patent Abstracts of Japan, vol. 018, No. 372, JP-A-06-103976, *Abstract.

*Primary Examiner*—Prince Willis, Jr.
*Assistant Examiner*—Jonathan S. Krueger
*Attorney, Agent, or Firm*—Sughrue, Mion, Zinn, Macpeak and Seas

[57] ABSTRACT

The present invention provides a lithium secondary cell containing a positive electrode including a material which occludes and exudes lithium; a negative electrode containing a negative material including graphite; and a separator disposed between the positive and negative electrodes; wherein the quantity of lithium occluded in the negative material in a fully-charged state is less than 55% of the theoretical lithium occlusion capacity of the negative electrode.

2 Claims, 2 Drawing Sheets

ORGANIC ELECROLYTE SECONDARY CELL

BACKGROUND OF THE INVENTION

1. Field of the Invention

The present invention relates to an organic electrolyte cell such as a lithium secondary cell, or the like.

2. Description of the Related Art

In recent years, electronic equipments such as portable wireless telephones, portable personal computers, portable video cameras, etc. have been developed, so that various kinds of electronic equipments have been miniaturized to be portable. With the reduction in size of electronic equipments, a cell having high energy density and light weight has been employed as a cell contained therein. A typical cell satisfying such requirements is a lithium secondary cell having, as a negative electrode active material, a lithium system such as a lithium metal, a lithium alloy, and lithium ions held by carbon, or the like, having, as an electrolytic solution, a nonprotic organic solvent containing lithium salt such as $LiClO_4$, $LiPF_6$, etc. dissolved therein, and having, as a positive electrode mainly containing graphite.

The lithium secondary cell is constituted by a negative electrode plate, a positive and a separator. The negative electrode plate holds the aforementioned negative electrode active material in a negative electrode collector which is a support thereof. The positive electrode plate holds a positive electrode active material reversibly electrochemically reacting to lithium ions such as lithium-cobalt complex oxide in a positive electrode collector which is a support thereof. The separator holds the electrolytic solution and is interposed between the negative and positive electrode plates to prevent short-circuiting between the two electrodes.

Incidentally, there has been proposed a technique of specifying the mean particle size of the positive electrode active material in order to increase the charge/discharge voltage and energy density of the lithium secondary cell (Japanese Patent Unexamined Publication Nos. Hei-1-304664 and Hei-4-162357). However, it has been found that large difference in performance between cells occurs in accordance with the particle size distribution even if the same mean particle size.

Further, since the lithium secondary cell uses a flammable organic solvent in an electrolytic solution, there is a problem in the safety thereof. When, for example, a nailing test (examining how influence is exerted on a storage cell when a nail is hammered in the cell) is made in a fully-charged state, there arises a problem in that the cell fires/fumes because the electrolytic solution catches fire by heating caused by short-circuit current.

To avoid such firing/heating, there has been conventionally taken a measure to thicken electrodes to thereby reduce their active areas or thicken a separator, or a measure to reduce the conductivity of the electrolytic solution to thereby increase resistance between electrodes to reduce short-circuit current. Because such measures reduce the efficient discharge performance and low-temperature performance of the cell on the other hand, it is very difficult to make safety and cell characteristic compatible with each other.

SUMMARY OF THE INVENTION

It is an object of the present invention to provide an organic electrolyte secondary cell excellent in cell performance, i.e., lifetime, safety, discharge performance and the like.

An organic electrolyte secondary cell is comprised of a negative electrode; a positive electrode containing an electrically conductive agent, a binding agent, and a positive electrode active material comprising $LiM_xCo_{1-x}O_2$ where M represents at least one member selected from the group of transition metals except Co, and x represents a value in a range $0 \leq x \leq 1.0$; a separator disposed between the positive and negative electrodes; and an organic electrolyte held by the separator; wherein an specific surface area of the positive electrode active material of the positive electrode is in a range of 0.35 to 2.0 $m^2/g$.

A lithium secondary cell of the present invention is comprised of a positive electrode including a material which occludes and exudes lithium; a negative electrode containing a negative material including graphite; and a separator disposed between the positive and negative electrodes; wherein the quantity of lithium occluded in the negative material in a fully-charged state is less than 55% of the theoretical lithium occlusion capacity of the negative electrode.

Accordingly, the present invention can provide an organic electrolyte secondary cell which is long in life and safety.

BRIEF DESCRIPTION OF THE DRAWINGS

In the accompanying drawings.

DETAILED DESCRIPTION OF THE INVENTION

Figure 1:
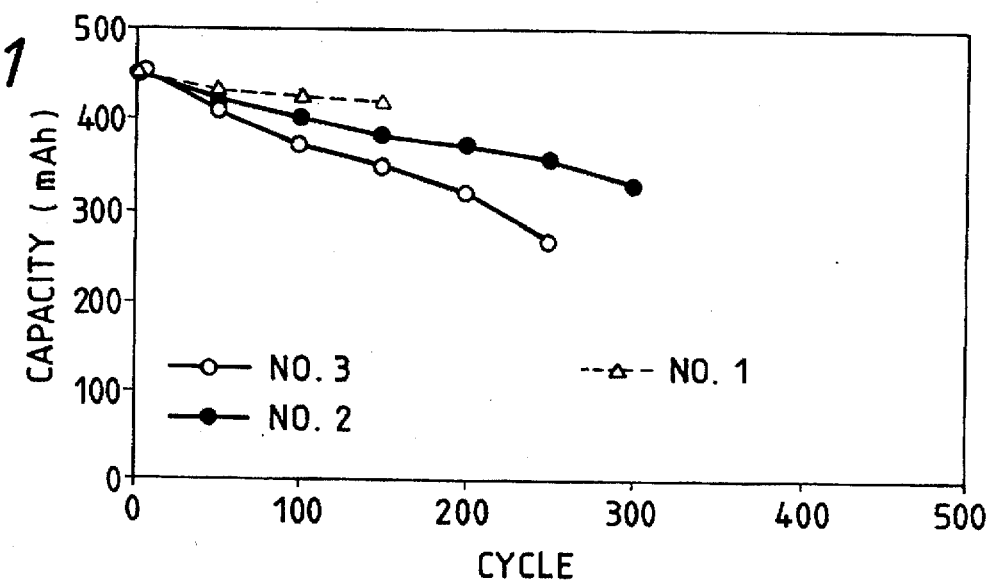
FIG. 1 is a graph on which the relation between charge-discharge cycle and cell capacity is plotted.

The detailed description of the present invention will be described as follows.

An organic electrolyte secondary cell according to the present invention is a secondary cell including a positive electrode, a negative electrode, a separator disposed between the positive and negative electrodes and an organic electrolyte held by the separator. The positive electrode contains an electrically conductive agent, a binding agent and $LiM_xCo_{1-x}O_2$ in which M represents at least one member selected from the group of transition metals except Co, and x represents a value in a range $0 \leq x \leq 1.0$ as an active material. In the secondary cell of the present invention, the specific surface area of the positive electrode active material is in a range of from 0.35 to 2.0 $m^2/g$. Specific examples of $LiM_xCo_{1-x}O_2$ include $LiCoO_2$, $LiMn_{0.15}Co_{0.85}O_2$, $LiNi_{0.10}Co_{0.90}O_2$, $LiNi_{0.37}Co_{0.63}O_2$, etc.

In the organic electrolyte secondary cell, both the half-value width of the (003) plane peak and that of the (104) plane peak in the X-ray diffraction graph of the positive electrode active material are preferably not larger than 0.50, particularly preferably in a range of from 0.10 to 0.20.

Each electrode plate contains an electrically conductive agent for electrically connecting active materials, and a binding agent for holding the active materials in a collector. Accordingly, the active material content is reduced relatively by the electrically conductive agent/binding agent content, so that the cell capacity becomes small compared with a theoretical cell of the same volume containing no electrically conductive agent and no binding agent.

In the present invention, since it is sufficient that the surface of the active material is covered with the electrically conductive agent and the binding agent, the specific surface area of the positive electrode active material is set to be not larger than 2.0 m$^2$/g to thereby reduce the content of the electrically conductive agent/binding agent contacting with the surface of the positive electrode active material to the value of minimum requirement. Particularly, in this case, the content of the electrically conductive agent is reduced to a value not larger than 8 wt % so that the active material content can be kept relatively large.

On the contrary, if the specific surface area of the positive electrode active material is too small, the reaction area between the active material and the electrolyte becomes small and the current density becomes excessive, so that voltage dropping or capacity lowering occurs when a large current is discharged. Therefore, in the present invention, the specific surface area of the positive electrode active material is selected to be not smaller than 0.35 m$^2$/g.

That is, in the present invention, the specific surface area of the positive electrode active material is limited to a range of from 0.35 to 2.0 m$^2$/g to thereby increase the active material content with the necessary reaction area maintained to thereby improve cell capacity and lifetime.

In addition, the half-value widths of X-ray diffraction peaks are limited as described above to thereby further improve cell capacity and lifetime. That is, the half-value width expresses crystallinity index, as well as it is known that the crystallinity index increases as the half-value width decreases and that the crystallinity decreases as the half-value width increases. Therefore, the crystallinity index of the active material is optimized by limiting the half-value width to the optimum range as described above so that Li ions are made to move easily while the packing density of active material particles is kept high. Consequently, large capacity and large current discharge can be made. If the half-value width is larger than 0.5, the crystallinity index becomes so low that the specific gravity of active material particles is light as well as the packing density becomes low and the capacity becomes small. If the half-value width contrariwise becomes near 0 extremely, the crystallinity index becomes too high to provide clearances so that Li ions hardly move and a large current cannot be discharged or a voltage drop increases remarkably when a current is discharged.

The present invention will be described as follows on the basis of examples in which the present invention is applied to a rectangular lithium ion secondary cell.

EXAMPLE 1

An aluminum foil having a thickness of 20 μm was prepared as a supporting member for supporting a positive electrode plate. 87 wt % of lithium-cobalt complex oxide LiCoO$_2$ as an active material, 5 wt % of acetylene black powder as an electrically conductive agent and 8 wt % of polyvinylidene fluoride PVDF as a binding agent were mixed with 44 wt % of n-methylpyrolidone to prepare paste. The specific surface area of the active material used and the half-value widths of X-ray diffraction peaks were as shown in Table 1.

TABLE 1

| No. | Specific surface area (m$^2$/g) | Half-value width of X-ray diffraction peak | |
|---|---|---|---|
| | | (003) Plane | (104) Plane |
| 1 | 0.45 | 0.118 | 0.141 |
| 2 | 0.35 | 0.165 | 0.188 |
| 3 | 0.33 | 0.150 | 0.225 |

Then, the paste was applied onto opposite surfaces of the supporting member to form a coating thickness of about 250 μm, and was dried. Continuously, while two hot rolls arranged to be parallel with each other at a distance of 150 μm were rotated to obtain a feed speed of 1 m/min, the supporting member coated with the paste was put between the hot rolls so as to be rolled. Core rods of the hot rolls contained heaters, and the condition for the heaters was set in advance so that the surfaces of the rolls operating were heated to 150° C. After rolling, the laminate of the paste and the supporting member was cut into a width of 30 mm to thus produce three kinds of positive electrode plates of the same shape and the same material except difference in specific surface area and crystallinity index between active materials.

A copper foil having a thickness of 20 μm was prepared separately as a supporting member for a negative electrode plate. 90 wt % of graphite as an active material and 10 wt % of PVDF as a binding agent were mixed with 56 wt % of n-methylpyrolidone to prepare paste. The paste was applied to opposite surfaces of the support, dried, rolled and cut into a width of 31 mm in the same manner as the positive electrode plate producing method to thus produce negative electrode plates.

As an electrolyte, used was a mixture solution of ethylene carbonate: diethyl carbonate: dimethyl carbonate=2:1:2 (volume proportion) containing 1 mol/l of LiPF$_6$. As a separator used was a polyethylene microporous film having a thickness of 25 μm and a width of 32.5 mm.

Then, the positive electrode plate, the separator and the negative electrode plate were piled up successively and wound ellipsoidally spirally on a polyethylene core. Then, they were electrically connected to positive and negative electrode leads and packed in a cell case. Then, the electrolyte was injected into the cell case and then the cell case was sealed by welding necessary portions to thus produce a secondary cell.

A cycle in which the thus obtained cell was charged with a constant current of 200 mA and a constant voltage of 4.1V at 25° C. for 3 hours, and then discharged down to 2.75V with a constant current of 400 mA at 25° C., was repeated so that the capacity of the cell was measured whenever 50 cycles passed.

FIG. 1 shows a graph on which the relation of cell capacity with the number of charge-discharge cycles is plotted. In the graph, Symbols Δ, ● and ○ show data using No. 1, No. 2 and No. 3 positive electrode active materials, respectively.

It is apparent from the graph that the cell using No. 3 active material smaller in specific surface area and larger in half-value width than the range of the present invention exhibits remarkable lowering of capacity with the increase of the number of cycles whereas the cell using No. 2 active material according to the present invention exhibits slow reduction of capacity and, furthermore, the cell using No. 1 active material large in specific surface area and small in half-value width exhibits a tendency to keep the capacity high.

EXAMPLE 2

A positive electrode active material used in this example was lithium-nickel-cobalt complex oxide $LiNi_{0.10}Co_{0.90}O_2$ having a specific surface area of 1.4 m²/g, a half-value width of the (003) plane of 0.20 and a half-value width of the (104) plane of 0.20. A cell was produced in the same condition as in Example 1 except the aforementioned condition, and then the charge-discharge cycle was repeated.

As a result, the 300th-cycle discharge capacity was 400 mAh, so that a performance nearly equal to that of the cell using No. 1 active material $LiCoO_2$ in Example 1 was obtained.

EXAMPLE 3

A positive electrode active material used in this example was lithium-cobalt complex oxide $LiCoO_2$ having a specific surface area of 1.8 m²/g, a half-value width of the (003) plane of 0.105 and a half-value width of the (104) plane of 0.120. Further, the proportion of a positive electrode mixture was set to be 85 wt % of $LiCoO_2$, 7 wt % of acetylene black powder and 8 wt % of PVDF. A cell was produced in the same condition as in Example 1 except the aforementioned condition and then the charge-discharge cycle was repeated.

As a result, the 300th-cycle discharge capacity was 390 mAh, so that a performance nearly equal to that of the cell using No. 1 active material $LiCoO_2$ in Example 1 was obtained.

COMPARATIVE EXAMPLE 1

A positive electrode active material used in this comparative example was lithium-nickel-cobalt complex oxide $LiNi_{0.37}Co_{0.63}O_2$ having a specific surface area of 2.2 m²/g, a half-value width of the (003) plane of 0.220 and a half-value width of the (104) plane of 0.215. A cell was produced in the same condition as in Example 1 except the aforementioned condition, and then the charge-discharge cycle was repeated.

As a result, the first-cycle discharge capacity was 410 mAh, so that the cell was inferior in performance to any cell using $LiCoO_2$ in Example 1.

COMPARATIVE EXAMPLE 2

A positive electrode active material used in this comparative example was lithium-nickel-cobalt complex oxide $LiNi_{0.37}Co_{0.63}O_2$ having a specific surface area of 0.28 m²/g, a half-value width of the (003) plane of 0.097 and a half-value width of the (104) plane of 0.100. A cell was produced in the same condition as in Example 1 except the aforementioned condition, and then the charge-discharge cycle was repeated.

As a result, from the first-cycle discharge time, the voltage increased to no more than 2.20V.

COMPARATIVE EXAMPLE 3

A positive electrode active material used in this comparative example was lithium-nickel-cobalt complex oxide $LiNi_{0.37}Co_{0.63}O_2$ having a specific surface area of 2.3 m²/g, a half-value width of the (003) plane of 0.51 and a half-value width of the (104) plane of 0.52. Though a trial to produce a cell in the same condition as in Example 1 except the aforementioned condition was made, not only the positive electrode active material scattered at the time of preparing paste but also the positive electrode active material in the paste was aggregated. As a result, the paste could not be applied to the support uniformly.

Further, a lithium secondary cell according to the present invention includes a material capable of occluding/exuding lithium in a positive electrode and a material mainly containing graphite in a negative electrode. In the lithium secondary cell, the quantity of lithium occluded in the negative electrode in a fully-charged state is smaller than 55% of the theoretical lithium occlusion capacity of the negative electrode.

Figure 2:
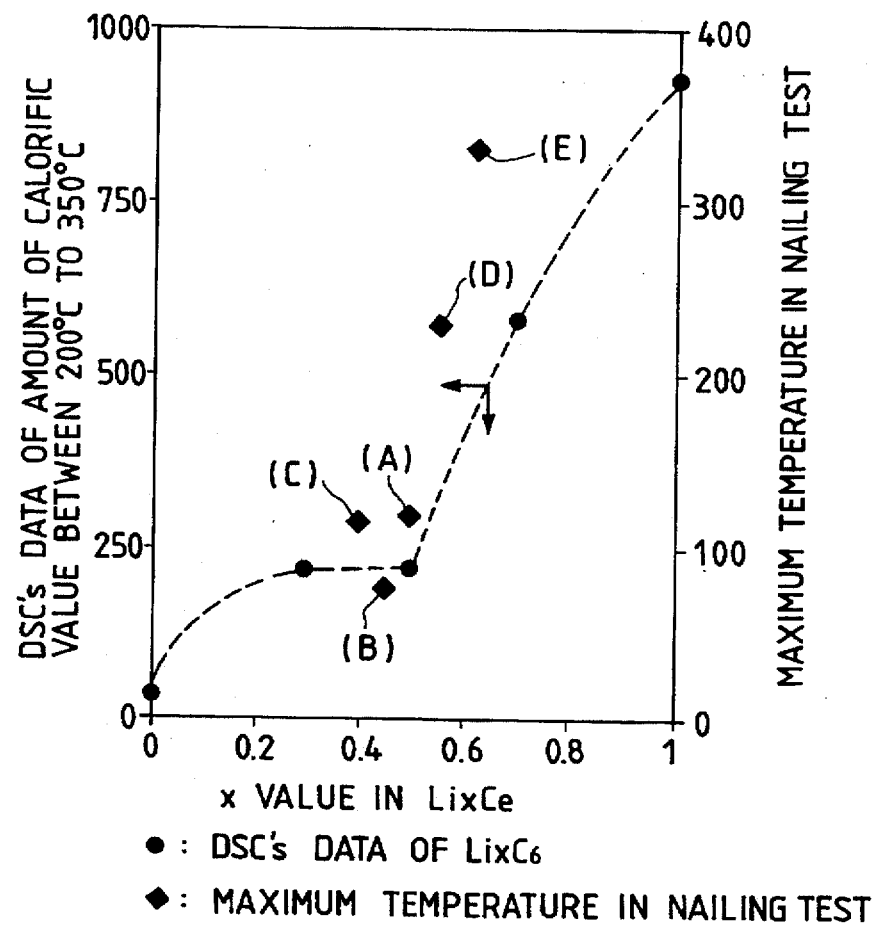
FIG. 2 is a graph showing the correlation between the quantity of lithium occluded and the thermal stability of the negative electrode plate.

The inventors of the present invention produced samples by way of trial so that the quantity of lithium occluded in the negative electrode plate mainly containing graphite was changed variously, enclosed the samples in small-sized closed packages of stainless steel, and researched the correlation between the quantity of lithium occluded and the thermal stability of the negative electrode plate by using a differential calorimeter (DSC). As a result, it was found that the calorific value between 200° C. and 350° C. increases remarkably when the quantity of lithium occluded is not smaller than 55% of the theoretical occlusion capacity as shown in FIG. 2 which will be described later, that is, when the composition of graphite in the negative electrode in a fully-charged state exceeds $Li_{0.55}C_6$. Preferably, according to FIG. 2, the quantity of lithium occluded is in a range of 30% to 50%.

Figure 3:
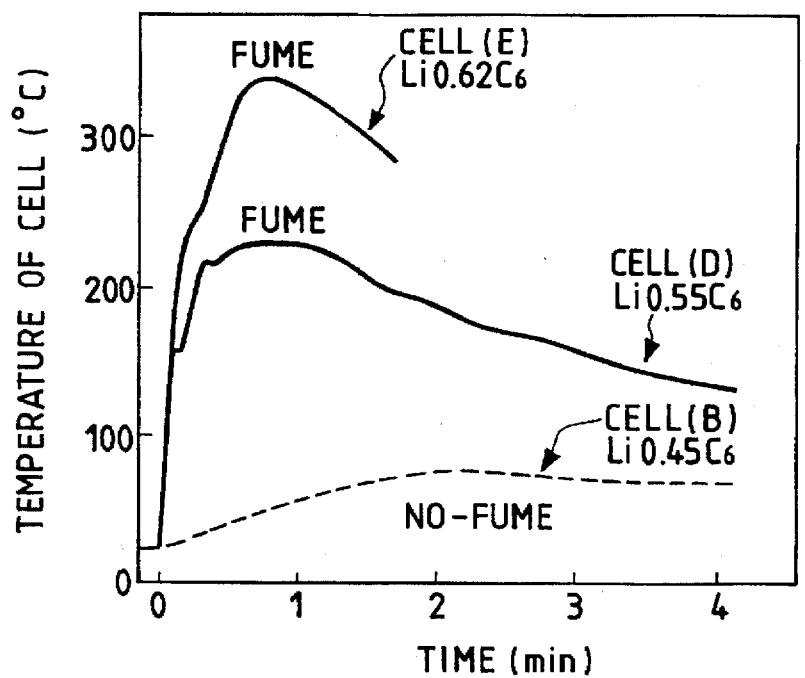
FIG. 3 is a graph showing heating behavior characteristic in a nailing test.

Then, as will be shown in the following examples, the inventors produced lithium cells different in the quantity of lithium occluded in the graphite negative electrode plate in a fully-charged state variously by way of trial and applied a nailing test to the cells. As a result, it was found as shown in FIG. 3 that the maximum value of the surface temperature of the cell decreases as the quantity of lithium occluded in the graphite negative electrode plate decreases. In this occasion, firing and fuming were observed in the cases of $Li_{0.62}C_6$ and $Li_{0.55}C_6$ whereas these phenomena did not occur in the case of $Li_{0.45}C_6$. Furthermore, even the operation of a safety valve opened with the increase of the internal pressure of the storage cell did not observed, so that the cell was found to be very safe. It was found from the previous result of the differential calorimetry and the result of the nailing test that the calorific value of the cell decreases remarkably when the quantity of lithium intercalation to the negative electrode mainly containing graphite in a fully-charged state is smaller than 55%, that is, when the composition of the graphite negative electrode is smaller than $Li_{0.55}C_6$ as shown in FIG. 2.

The inventors of the present invention consider that the aforementioned phenomenon is caused by the fact that there is not induced any interaction with large heat such as direct interaction between graphite and occluded lithium when the quantity of lithium occluded in the graphite negative electrode is smaller than 55%, because graphite is thermally stable even if the large short-circuit current by the nailing test raises the internal temperature of the cell.

EXAMPLE 4

Figure 4A:
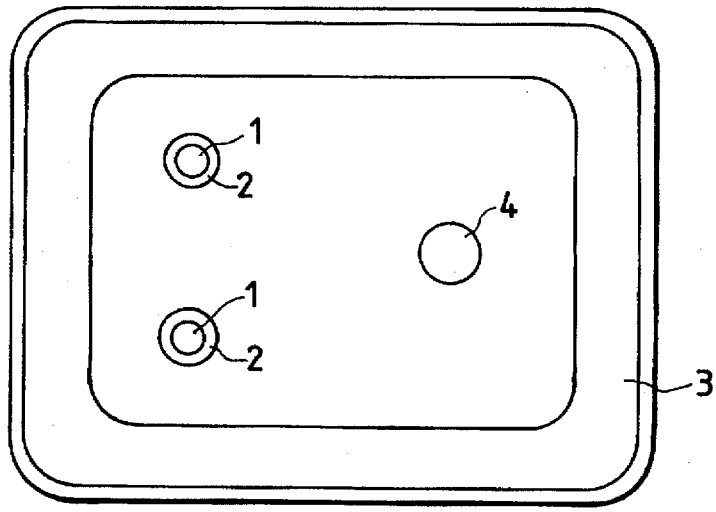
FIG. 4A is a plan view showing the lithium secondary battery according to the present invention.
Figure 4B:
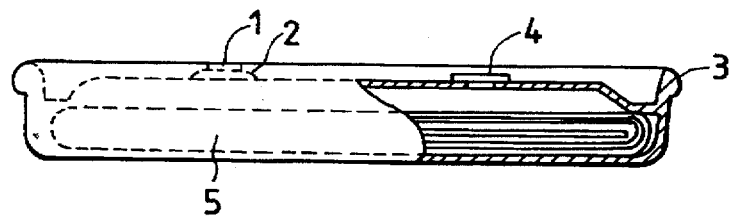
FIG. 4B is a partly cutaway sectional view of the cell according to the present invention.

FIG. 4A is a plan view showing the lithium secondary battery according to the present invention; and FIG. 4B is a partly cutaway sectional view of the cell according to the present invention. The cell of this example is a rectangular lithium secondary cell in which rivet type terminals 1 are caulked to be fixed to a cell case 3 through gaskets 2. The cell case 3 is designed so that a sealing plate and a case body are molded by a material obtained by laminating a resin film on a steel plate and are then airtightly sealed by a double-rolled sealing method. The reference numeral 4 designates an explosion valve type safety valve using a metal film. The reference numeral 5 designates a cell generator element formed by winding belt-shaped positive and negative electrode plates ellipsoidally spirally through a separator. The positive and negative electrode plates of the cell generator element 5 are electrically connected to the rivet terminals 1, respectively, in the cell.

The positive electrode plate was produced by: mixing $LiCoO_2$ as an active material, carbon powder as a conduction assisting agent and polyvinylidene fluoride as a binding agent; dissolving the mixture in N-methylpyrolidone as a solvent to form paste; applying the paste onto an aluminum foil; and heating, pressing and molding the aluminum foil to which the paste is applied.

The negative electrode plate was produced by: mixing artificial graphite with polyvinylidene fluoride as a binding agent; dissolving the mixture in N-methylpyrolidone as a solvent to form paste; applying the paste onto a copper foil; and heating, pressing and molding the copper foil.

As an electrolyte, 1M $LiPF_6$/ethylene carbonate+dimethyl carbonate+diethyl carbonate DEC (2:2:1) was injected into the aforementioned cell.

A cell in which the quantity of lithium occluded into graphite of the negative electrode is set to be smaller than 55% ($Li_{0.55}C_6$) of the theoretical capacity thereof by adjusting the quantities of active materials in the positive and negative electrode plates when the cell is fully charged up to 4.1V is made the cell of the present invention. In this occasion, three kinds of cells (A), (B) and (C) of the same structure except that the quantities of lithium occluded into the respective negative electrodes were set to be in values shown in Table 2, were produced byway of trial.

For the sake of comparison, cells (D) and (E) which were the same structure as above except that the quality of lithium occluded in the negative electrode in a fully-charged state exceeded 55% of the theoretical occlusion capacity.

TABLE 2

| Cell No. | Quantity of Lithium Occluded into Negative Electrode While Fully Discharged | Discharge Capacity (mAh) |
| --- | --- | --- |
| (A) | $Li_{0.52}C_6$ | 870 |
| (B) | $Li_{0.45}C_6$ | 820 |
| (C) | $Li_{0.40}C_6$ | 760 |
| (D) | $Li_{0.55}C_6$ | 980 |
| (E) | $Li_{0.62}C_6$ | 1040 |

The aforementioned nailing test was applied to these cells, and the results of FIG. 2 were obtained. That is, it became clear from the nailing test that, when the quantity of lithium occluded into graphite contained in the negative electrode in a fully-charged state is set to be smaller than 55% of the theoretical occlusion capacity, a lithium secondary cell which is very high in safety so that firing/fuming can be prevented is obtained.

What is claimed is:

1. A lithium secondary cell comprising: a positive electrode including a material which occludes and exudes lithium; a negative electrode containing a negative material including graphite; and a separator disposed between said positive and negative electrodes; wherein the quantity of lithium occluded in said negative material in a fully-charged state is less than 55% of the theoretical lithium occlusion capacity of said negative electrode.

2. A lithium secondary cell according to claim 1, wherein the quantity of lithium occluded in said negative material in a fully-charged state is in a range of 30% to 50%.

* * * * *